United States Patent [19]  [11]  4,178,538
Kelly, III  [45]  Dec. 11, 1979

[54] RECHARGEABLE CELL CHECKER

[75] Inventor: William T. Kelly, III, Wilton, Conn.

[73] Assignee: Union Carbide Corporation, New York, N.Y.

[21] Appl. No.: 788,600

[22] Filed: Apr. 18, 1977

[51] Int. Cl.² .............................................. H02J 7/00
[52] U.S. Cl. ......................................... 320/2; 320/48; 340/636
[58] Field of Search .................... 340/249, 636; 320/2, 320/48; 324/29.5

[56] References Cited

U.S. PATENT DOCUMENTS

| 2,864,055 | 12/1958 | Kordesch et al. ................. 320/48 X |
| 3,041,522 | 6/1962 | Beck et al. .......................... 320/48 X |
| 3,959,706 | 5/1976 | Mabuchi et al. ........................ 320/2 |

Primary Examiner—Robert J. Hickey
Attorney, Agent, or Firm—Cornelius F. O'Brien

[57] ABSTRACT

A rechargeable cell checker having a primary cell for providing a quick charge to a rechargeable cell and an indicating means, such as a light, for indicating whether the rechargeable cell took and held the charge.

10 Claims, 6 Drawing Figures

RECHARGEABLE CELL CHECKER

FIELD OF THE INVENTION

The invention relates to a portable, self-contained rechargeable cell checker having power means for charging a rechargeable cell and display means for indicating whether the cell held the charge.

BACKGROUND OF THE INVENTION

Rechargeable cells, such as the nickel-cadmium cells, have a relatively constant potential during discharge and can be recharged many times, thus extending their useful life. In general, any secondary or rechargeable cell contains a combination of active materials which can be electrolytically oxidized and reduced repeatedly. In rechargeable cells, reactions at both electrodes are reversible and the input of current in the appropriate direction from an outside source will reverse the discharge reaction and, in effect, recharge the electrodes.

The rechargeable cells have been used in various type devices, such as toys, calculators, radios and other types of power-operated devices. Many of the power-operated devices on the market today have been designed to accommodate cylindrical cells of the "AA," "C," and "D" size. These sizes have now become standard-type cells sizes having overall dimensions which can be found in various publications, such as The American National Standard Specifications For Dry Cell Batteries—ANSI C18.1-1969 published by the American National Standards Institute, Inc., New York, N.Y.

There are many different types of chargers on the market which employ standard transformer and half-wave or full-wave rectifier circuit means for providing a direct current for charging rechargeable type cells or batteries. The cell holders of the chargers are generally designed to accommodate a single size cell. Recently, cell holders have been designed which can accommodate two or more standard size cells with or without the use of adapters. Although rechargeable cells generally can be discharged and charged many times, they usually reach a state in which the reactions at both electrodes become non-reversible. The cell at this state is usually referred to as being unable to take or hold a charge. The placement of such cells in battery chargers not only results in a waste of time but also results in a wasteful expenditure of energy from the power source charging the cell.

Rechargeable cells, such as nickel-cadmium cells, off the production line usually have to be initially charged before use. Inadvertently during the manufacture of such cells, some may be improperly assembled or have other defects that render them inoperable as working cells. The charging of these defective cells again would result in a waste of time and a needless expenditure of energy.

One of the objects of the present invention is to provide a rechargeable cell checker that can deliver an initial quick charge and then indicate whether the cell took the charge.

Another object of the present invention is to provide a rechargeable cell checker that can be constructed to accommodate and check various size cells.

Another object of the present invention is to provide a portable rechargeable cell checker having a cell power source for providing a quick charge to a rechargeable cell and a light or meter indicating means to reveal whether the rechargeable cell took and held the charge.

Another object of the present invention is to provide a rechargeable cell checker that has a minimum of parts which are easy to assemble, economical to make and simple to use.

The foregoing and additional objects will become more fully apparent from the following description and the accompanying drawing.

SUMMARY OF THE INVENTION

The invention broadly relates to a portable, self-contained rechargeable cell checker comprising a power source having first and second contact terminals; a cell power indicating display means having first and second contact terminals; first and second output contact terminals adapted for accommodating a rechargeable cell therebetween; and switching means having first switch contact means connected to the first output contact terminal, and second switch contact means adapted for alternately connecting to the first contact terminal of the power source and the first contact terminal of the display means; the second terminal of the power source being connected to the second terminal of the display means and the second output contact terminal; said checker being operable such that when a rechargeable cell is disposed and connected between the first and second output contact terminals, the switching means can be activated to sequentially connect the second switch contact means to the first contact of the power source thereby connecting the rechargeable cell across the power source for receiving a charge and then to the first contact terminal of the display means thereby connecting the rechargeable cell across the display means which will reveal whether the rechargeable cell held the charge received from the power source.

The power source for use in this invention can be at least one primary or secondary cell which is capable of delivering an output voltage greater than the voltage of the cell to be charged. It is also within the purview of this invention to have a resistance element connected in series with the first and second output contact terminals so as to decrease the charging current to accommodate the charging characteristics of smaller capacity cells. The resistive element could be connected in series with one of the output contact terminals of the rechargeable cell checker or it could be connected in series with the power source of the rechargeable cell checker. The main requirement is that the resister be in series with the power source so as to reduce the charging current when desired. Preferably, the resistive element should be in series with the power source so as not to reduce the power fed to the indicating display means when the rechargeable cell is coupled across the indicating display means.

The indicating display means could be a miniature type lamp, a current or voltage meter, or any other device which would indicate the presence of a voltage difference or current flow across the terminals of a rechargeable cell.

The present invention will become more apparent from the following description thereof when considered together with the accompanying drawing which is set forth as being exemplary of embodiments of the present invention and is not intended in any way to be limitative thereof and wherein.

DETAILED DESCRIPTION OF THE DRAWING

Figure 1:
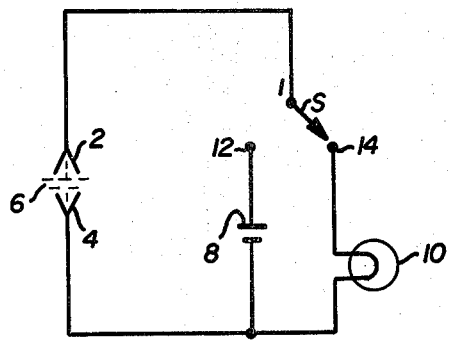
FIG. 1 is a circuit diagram showing an embodiment of this invention.

In FIG. 1 there is shown a circuit of a rechargeable cell checker in accordance with the invention. Specifically, the rechargeable cell checker of this invention is provided with output contact terminals 2 and 4 which are adapted to accommodate and connect in series a rechargeable cell 6 shown in broken lines. Output contact terminal 2 is connected to the common terminal 1 of single-pole double-throw switch S and output contact terminal 4 is connected to one terminal of cell 8 and one terminal of indicating lamp 10. The opposite terminal of cell 8 is connected to terminal 12 of switch S while the opposite terminal of lamp 10 is connected to terminal 14 of switch S. Preferably, the common terminal 1 of single-pole double-throw switch S would normally be in contact with terminal 14 so that when a rechargeable cell 6 is coupled in series between output terminals 2 and 4, the cell 6 will be initially coupled in parallel across the indicating lamp 10 and not the power source 8. In the operational mode of the circuit, a rechargeable cell 6 would be coupled in series to output contact terminals 2 and 4 and when switch S would be activated such that common terminal 1 electrically contacts terminal 12. This would connect rechargeable cell 6 in parallel across power source cell 8 with their polarities opposing so that the power source cell 8 will provide an initial charge to the rechargeable cell 6. After as little as 10 seconds, the switch can be activated by switching the common terminal 1 to electrically contact terminal 14 thereby coupling rechargeable cell 6 in parallel across indicating lamp 10. If rechargeable cell 6 is a properly functioning cell, then it will light lamp 10 thereby indicating that the cell held the charge received from the power source cell 8. The cell could then be charged in a conventional type charging device, or the charging device disclosed in U.S. patent application Ser. No. 781,995, filed on Mar. 28, 1977 in the names of W. T. Kelly, III and F. Stahl. Thus the simple circuit arrangement as shown in FIG. 1 will provide an economical means for quickly checking rechargeable cells.

Figure 2:
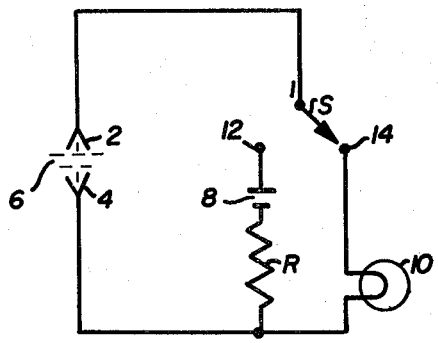
FIG. 2 is a circuit diagram of an alternate embodiment of this invention.

FIG. 2 shows an alternate embodiment of the circuit of FIG. 1 employing the same components identified with the same reference numbers, with the only exception being a resistive element R1 connected in series between power source cell 8 and output contact terminal 4, said output contact terminal 4 being also directly connected to one terminal of indicating lamp 10. Thus since resistive element R is connected in series with the power source cell 8, it will decrease the current charge delivered from power source cell 8. This resistive element could be used when lower capacity type rechargeable cells are to be checked, that is, when the voltage of the rechargeable cell 6 to be checked is substantially lower than the voltage output of the power source cell 8. However, it is essential in this type circuit in which resistive element R is connected in series between rechargeable cell 6 and the power source cell 8 that the voltage across the series connected power source cell 8 and resistive element R be higher than the voltage across the rechargeable cell 6. This circuit will operate in the same basic manner as the operation of the circuit described in FIG. 1.

Figure 3:
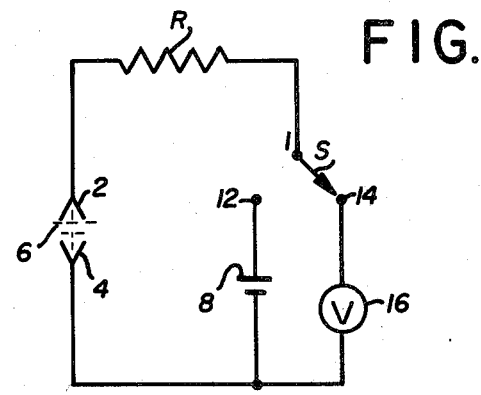
FIG. 3 is a circuit diagram showing another alternate embodiment of this invention.

FIG. 3 shows an alternate embodiment of the circuit of FIG. 2 employing the same components identified with the same reference numbers with the exceptions that the indicating lamp 10 has been replaced with a voltage indicator and the resistive element R has been connected in series between output terminal 2 and the common terminal 1 of the single-pole double-throw switch S. Again, the resistive element R would serve the same function as resistive element R employed in circuit 2. The voltage indicator would display the voltage across the rechargeable cell such that a reading below a certain predetermined level would indicate malfunctioning of the rechargeable cell while a reading above the predetermined level would indicate a good functioning rechargeable cell. It is thus evident from FIGS. 1, 2 and 3 that the indicating means could be any device capable of displaying or indicating that the rechargeable cell 6 has sufficient voltage capacity so as to be considered a good functioning cell. Consequently, if an incandescent lamp is employed as the indicating means as shown in FIGS. 1 and 2, the voltage for activating the lamp should be such that if the lamp lit, it would indicate that the rechargeable cell has at least that voltage level thus indicating the cell to be a good functioning cell. The switching means for use in this circuit could be a conventional slide or push button switch which, in the normally closed position, would connect the indicating means 10 in parallel to the output terminals 2 and 4, and in the activated or depressed positions, respectively, the switch would connect the output terminals 2 and 4 in parallel to the power source cell 8.

Figure 4:
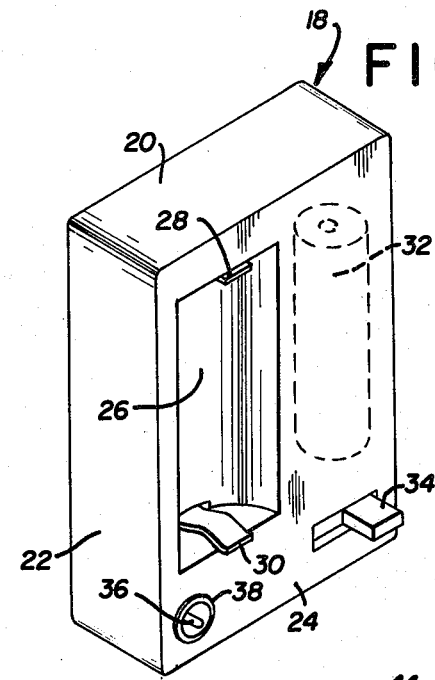
FIG. 4 is an isometric view of a rechargeable cell checker of the present invention.

FIG. 4 shows an isometric view of a rechargeable cell checker 18 comprising a rectangular box member having upstanding side walls 20 and 22 and a top surface 24. Disposed in the top surface 24 is a longitudinal groove 26 aligned proximal the upstanding side wall 22, said longitudinal groove having spring-type terminals 28 and 30 spaced sufficiently apart so as to accommodate a specific size rechargeable cell. Terminals 28 and 30 would correspond to terminals 2 and 4, respectively, as shown in FIGS. 1 through 3. Disposed interiorly of the checker would be a power source cell 32 which would be connected as shown in FIG. 1, that is, one terminal to sliding switch 34 and the other terminal to terminal 30. Also disposed on the top surface 24 of the battery checker 18 is an indicating lamp 36, the terminals of which would be connected as shown in FIG. 1, that is, one terminal would be connected to terminal 30 and the second terminal would be connected to the sliding switch 34. As shown in FIG. 4, the indicating lamp 36 is recess mounted in the top surface 24 of the checker and has a rubberized ring member 38 disposed on said surface 24 concentrically about said lamp 36. The sliding switch 34 would be normally connected such that the indicating lamp 36 would be connected in parallel across battery terminals 28 and 30. In the operational mode, a rechargeable cell would be placed into groove 26 with its terminals making contact with terminals 28 and 30. Switch 34 would be slid to the left thereby connecting the rechargeable cell in parallel across power source cell 32 after which the switch would be returned to the right, thus connecting the rechargeable cell in parallel across the indicating lamp 36. If the lamp lit, then it would indicate that the rechargeable cell took and held the charge delivered by the power source cell 32. The terminals 28 and 30 of the battery checker 18 could be made of any suitable conductive spring material, such as nickel-plated spring brass, nickel-plated copper, tin-plated copper, cadmium-plated copper, etc. The rechargeable cell checker housing could be molded or otherwise fabricated using a suitable plastic material, e.g., phenolic, polyolefin, polyethylene, polypropylene, copolymers of acrylonitrile, butadiene or styrene, or any other suitable material capable of supporting the cell to be checked and withstanding normal handling and use without breaking.

Figure 5:
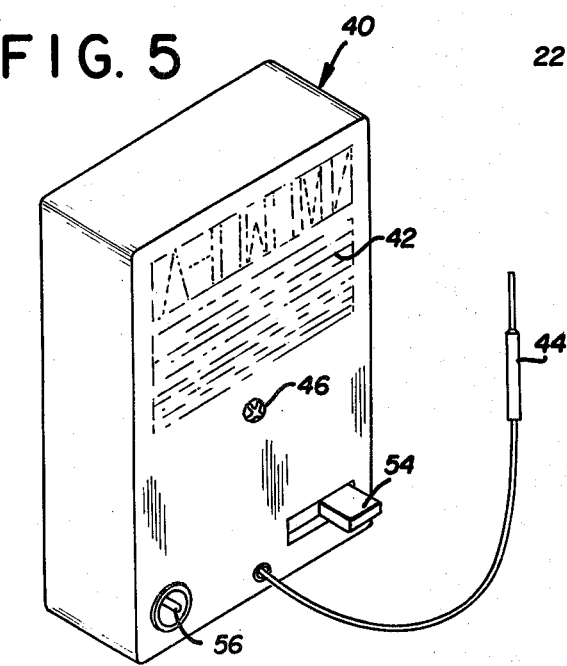
FIG. 5 is an isometric view of another embodiment of a rechargeable cell checker of the present invention.
Figure 6:
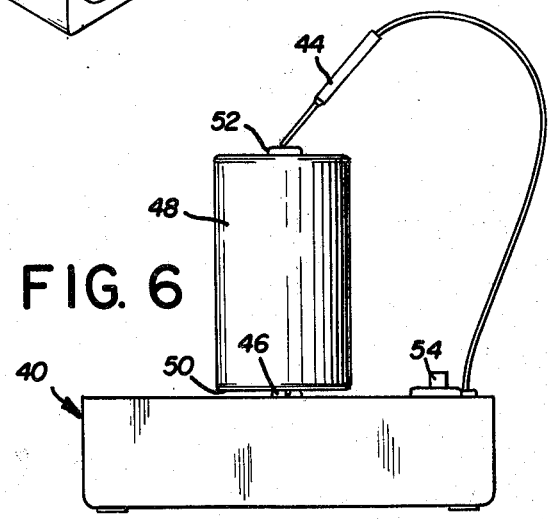
FIG. 6 is a side view of the rechargeable cell checker shown in FIG. 5 along with a side elevational view of a rechargeable cell in position to be checked.

FIGS. 5 and 6 show another embodiment of a rechargeable cell checker 40 having the same circuit arrangement and components as described in conjunction with FIG. 4, with the exception that the top surface 42 of the checker 40 does not have a groove and the output terminals which correspond to terminals 2 and 4 as shown in FIG. 1 comprise a probe 44 and conductive screw 46, respectively. This type of rechargeable cell checker can accommodate various sizes and shapes of rechargeable cells since, as shown in FIG. 6, a rechargeable cell 48 can be disposed such that one of its terminals 50 contacts the conductive screw 46 while probe 44 is maneuvered to contact the second terminal 52 of the rechargeable cell 48. Again, the sliding switch element 54 and indicating lamp means 56 would operate in the same manner as described in conjunction with FIG. 4. As is apparent from FIG. 6, the flexibility and maneuverability of probe 44 will enable this type of rechargeable cell checker to be used in the checking of various sizes and shapes of rechargeable cells.

EXAMPLE

Using the circuit as shown in FIG. 1, a rechargeable cell checker was constructed and assembled in a housing as shown in FIGS. 5 and 6. The power source cell employed was a conventional primary alkaline power cell having an output voltage of approximately 1.5 volts. The incandescent lamp employed was a 1.2 volt rated No. 112 Pocketlight Lamp obtained from Union Carbide Corporation. A nickel-cadmium rechargeable "D" size cell having an approximate output voltage of 1.20 to 1.25 volts was taken from storage and positioned on the rechargeable cell checker as shown in FIG. 6. With the probe connected to one terminal of the cell and the conductive screw contacting the second terminal of the cell, the cell was connected in parallel across the indicating lamp which did not light. The switch was activated thereby placing the rechargeable nickel-cadmium cell in parallel across the alkaline primary cell and held in this position for about 10 seconds. The switch was returned to its original position thereby connecting the nickel-cadmium rechargeable cell in parallel across the indicating lamp which now lit. This procedure was followed for several other nickel-cadmium cells. In the instances where the light lit after a rechargeable cell received a quick initial charge, the cell was found to be in good functional condition, that is, the cell was able to take a charge. In the instances where the light did not light after the quick initial charge, the cell was found to be defective for one or more reasons. Thus it is apparent that the rechargeable cell checker of this invention can quickly and easily determine the most obvious and substantially defective cells without the need for a time consuming full charge and discharge test.

Alternative embodiments and modes of practicing the invention, but within its spirit and scope, will, in the light of this disclosure, occur to persons skilled in the art. It is intended, therefore, that this description be taken as illustrative only and not be construed in any limiting sense.

What is claimed is:

1. A portable, self-contained rechargeable cell checker comprising a power source having first and second contact terminals; a lamp having first and second contact terminals; first and second output contact terminals adapted for accommodating a rechargeable cell therebetween; and switching means having first switch contact means connected to the first output contact terminal, and second switch contact means adapted for alternately connecting to the first contact terminal of the power source and the first contact terminal of the lamp; the second terminal of the power source being connected to the second terminal of the lamp and the second output contact terminal, said checker being operable such that when a rechargeable cell is disposed and connected between the first and second output contact terminals, the switching means can be activated to sequentially connect the second switch contact means to the first contact of the power source thereby connecting the rechargeable cell across the power source for receiving a charge and then to the first contact terminal of the lamp thereby connecting the rechargeable cell across the lamp which will reveal whether the rechargeable cell held the charge received from the power source.

2. The rechargeable cell checker of claim 1 wherein the power source is a cell.

3. The rechargeable cell checker of claim 1 wherein a resistive element is connected in series with the first and second output contact terminals.

4. The rechargeable cell checker of claim 1 wherein a resistive element is connected in series with the power source.

5. The rechargeable cell checker of claim 1 wherein the switching means is a single-pole double-throw switch.

6. A portable, self-contained rechargeable cell checker comprising a power source having first and second contact terminals; a volt meter having first and second contact terminals; first and second output contact terminals adapted for accommodating a rechargeable cell therebetween; and switching means having first switch contact means connected to the first output contact terminal, and second switch contact means adapted for alternately connecting to the first contact terminal of the power source and the first contact terminal of the volt meter; the second terminal of the power source being connected to the second terminal of the volt meter and the second output contact terminal, said checker being operable such that when a rechargeable cell is disposed and connected between the first and second output contact terminals, the switching means can be activated to sequentially connect the second switch contact means to the first contact terminal of the power source thereby connecting the rechargeable cell across the power source for receiving a charge and then to the first contact terminal of the volt meter thereby connecting the rechargeable cell across the volt meter which will reveal whether the rechargeable cell held the charge received from the power source.

7. The rechargeable cell checker of claim 6 wherein the power source is a cell.

8. The rechargeable cell checker of claim 6 wherein a resistive element is connected in series with the first and second output contact terminals.

9. The rechargeable cell checker of claim 6 wherein a resistive element is connected in series with the power source.

10. The rechargeable cell checker of claim 1 wherein the switching means is a single-pole double-throw switch.

* * * * *

UNITED STATES PATENT AND TRADEMARK OFFICE
CERTIFICATE OF CORRECTION

PATENT NO. : 4,178,538
DATED : December 11, 1979
INVENTOR(S) : William Tolson Kelly, III It is certified that error appears in the above-identified patent and that said Letters Patent are hereby corrected as shown below:

Column 6, line 27 (claim 1), the word "terminal" should be inserted after the word "contact".

Signed and Sealed this

Twenty-second Day of July 1980

[SEAL]

Attest:

SIDNEY A. DIAMOND

Attesting Officer     Commissioner of Patents and Trademarks